Oct. 24, 1933.  R. R. STEVENS  1,932,091
CONTROLLING VALVE FOR COUPLERS
Original Filed Feb. 3, 1928
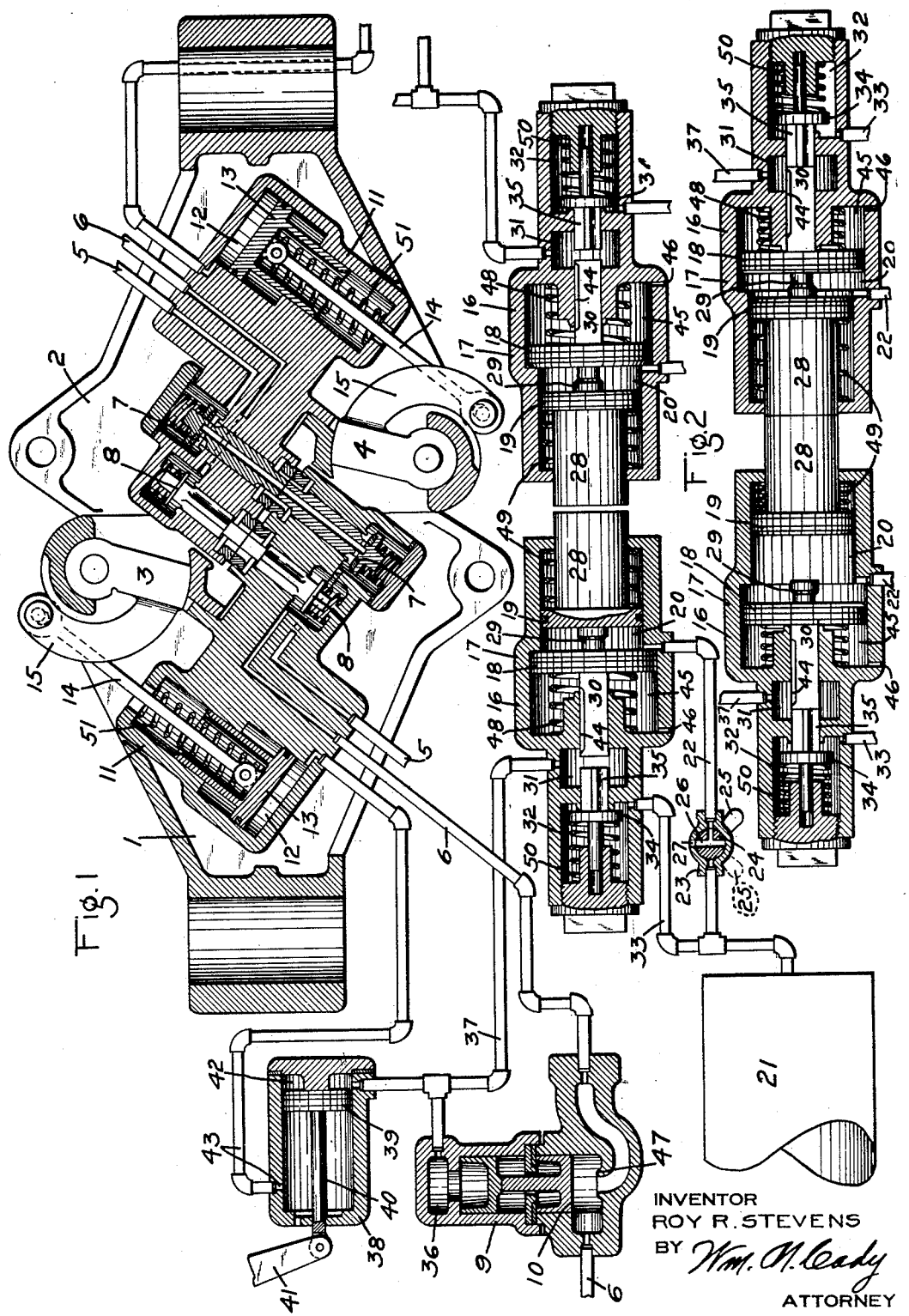
INVENTOR
ROY R. STEVENS
BY Wm. N. Cady
ATTORNEY Patented Oct. 24, 1933

1,932,091

UNITED STATES PATENT OFFICE 1,932,091

CONTROLLING VALVE FOR COUPLERS

Roy R. Stevens, Forest Hills, Pa., assignor to The Westinghouse Air Brake Company, Wilmerding, Pa., a corporation of Pennsylvania Application February 3, 1928, Serial No. 251,545
Renewed March 24, 1933

8 Claims. (Cl. 213—76)

This invention relates to automatic car couplers and particularly to the type having means for tightly locking the couplers in coupled position and known as the tight lock coupler.

One object of my invention is to provide improved means associated with a coupler of the above type whereby the locking means of two coupled couplers may be released when the operator releases the locking means associated with one coupler.

Other objects and advantages will appear from the following more detailed description.

In the accompanying drawing; Fig. 1 is a diagrammatic view, partly in section, of two car couplers in coupled positions, both of the couplers embodying the invention; and Fig. 2 is a diagrammatic sectional view of the controlling mechanism of two couplers, the parts of the mechanisms being in positions to release the coupler locking cams.

In the accompanying drawing, the reference characters 1 and 2 indicate counterpart car couplers which are adapted to automatically couple upon their coming together, and are adapted to be automatically locked in their coupled positions by locking cams 3 and 4, pivotally mounted on the respective couplers, the cam 3 engaging the coupler 2 and the cam 4 engaging the coupler 1.

These couplers, besides coupling two adjacent cars together, also serve to couple the pipes of the fluid pressure brake systems of the cars, such as the main reservoir pipe 5 and brake pipe 6, and if desired, other pipes may also be connected. The conduit through each of the couplers, for the main reservoir pipe 5, is controlled by a tappet valve 7, and the conduit for the brake pipe 6 is controlled by a tappet valve 8.

Interposed in the brake pipe 6 of each car, is a brake pipe closing valve device 9, having a piston valve 10, contained within the casing thereof, adapted to be automatically operated to shut off the supply of fluid under pressure from the brake pipe to the face of the coupler to prevent the loss of air from the brake pipe when two coupled couplers are being uncoupled.

Associated with each of the couplers 1 and 2, is a coupler lock operating mechanism which may comprise a casing 11, having a chamber 12, containing a piston 13, which is provided with a stem 14 that projects through a wall of the casing 11, and at its outer end is operatively connected with the arm 15 of the adjacent coupler locking cam. The casing 11 may be an integral part of the coupler or may be a separate part which may be secured to the coupler in any desired manner.

For the purpose of controlling the operation of the coupler lock operating mechanisms of the couplers of adjacent cars, controlling devices 16 are provided, each of which may be carried by one of the couplers or may be made a part thereof. Each controlling device 16 may comprise a cylinder 17 containing spaced pistons 18 and 19. The chamber 20 between these pistons is connected to a suitable fluid pressure supply source, such as a main reservoir 21, by a pipe 22, there being a hand operated cock device 23 interposed in the pipe 22. This cock device may comprise a casing having a plug valve 24 rotatably mounted therein which is adapted to be operated manually by a handle 25. When the handle 25 is in the position shown in full lines in the drawing, the chamber 20 is vented to the atmosphere through pipe 22, passage 26 in the plug valve 24 and port 27 in the casing of the cock device. When the handle 25 is turned to the position shown in dotted lines in the drawing, fluid under pressure flows from the reservoir 21 to the chamber 20, by way of pipe 22 and passage 26 of the plug valve 24.

Extending outwardly from the piston 19, and preferably integral therewith, is a plunger 28, which passes through an opening in an end wall of the casing, and at its end is adapted to cooperate with the counterpart plunger 28 of an adjacent controlling device.

The piston 18 is provided with a projection 29 with which the piston 19 is adapted to engage, said projection maintaining the pistons 18 and 19 in spaced relation when they are in their normal positions of rest, as shown in Fig. 1 of the drawing. The piston 18 has a stem 30 which extends through a wall in the casing and terminates within a chamber 31 formed in the casing.

Contained in a chamber 32 which is connected to the reservoir 21 by a pipe 33, is a valve 34, operative to control the flow of fluid under pressure from the chamber 32 to the chamber 31, said valve having a fluted stem 35 which extends through a wall of the casing into the chamber 31, where it is adapted to be operatively engaged by the end of the piston stem 30.

The chamber 31 of the controlling device 16 is connected to piston chamber 36 of the brake pipe closing valve device 9, by a pipe 37, which pipe also leads to a piston device 38 which is adapted to operate an electric train line coupler (not shown). As this electric train line coupler and the mechanism for operating it may be of the same general character as that fully described and shown in United States Letters Patent No.

1,571,222 to Harry F. Woernley, granted February 2, 1926, and as this coupler mechanism, as a whole, does not constitute a part of the present invention, a detailed description thereof has been omitted.

The piston device 38 may comprise a cylinder containing a piston 39 having a stem 40 extending through one end of the cylinder and connected at its outer end with a lever 41 for operating the contact carrier of the electric train line coupler. The chamber 42, at one side of the piston 39, is connected to the chamber 31 of the controlling device 16 by the pipe 37, and upon a predetermined forward movement of the piston 39 by fluid under pressure supplied through the pipe 37, a port 43 will be uncovered, so that fluid under pressure may flow from the chamber 42, to the piston chamber 12 of the coupler lock operating mechanism associated with the coupler 1, by way of port and pipe 43.

Assuming the couplers at the adjacent ends of two cars to be equipped with my invention, and coupled as shown in Fig. 1 of the drawing, the tappet valves 7 and 8 will be open, having been unseated by the engagement of the tappets upon the coming together of the counterpart couplers, so that communication is established through the main reservoir pipe 5 and brake pipe 6. When the cars are thus coupled, the chambers 42 of the piston devices 38 and the chambers 36 of the brake pipe closing valve devices 9 are vented to the atmosphere by way of pipes 37, chambers 31 of the controlling devices 16, grooves 44 in the piston stems 30, chambers 45 of the controlling devices 16 and atmospheric ports 46 in the casings of the controlling devices. As the piston chambers 36 of the brake pipe closing valve devices are vented to the atmosphere, fluid at brake pipe pressure flowing through these devices will maintain the valves 10 unseated from their seat rings 47.

Further, when the couplers 1 and 2 are coupled and the cock devices 23 closed, the pistons 18 and 19 of the controlling devices will be in their normal positions of rest as shown in Fig. 1 of the drawing, and will be maintained in such positions by the pressure of springs 48 and 49, respectively, until such time as one of the valve devices 23 is operated to its open position. When the pistons 18 and 19 are in their normal positions of rest, the ends of the plungers 28 are out of operative engagement with each other and the stems 30 of the pistons 18 are out of operative engagement with the ends of the valve stems 35, so that, by the pressure of springs 50, the valves 34 will be maintained seated and the valve chambers 32 will be charged with fluid under pressure from the reservoir 21.

When it is desired to uncouple the couplers 1 and 2, an operator moves the handle 25 of the cock device 23 on one car, to the position as shown by dotted lines in Fig. 1 of the drawing, causing the plug valve 24 to rotate to close the atmospheric port 27 and establish communication through the cock device, so that fluid under pressure from the reservoir 21, will flow to the chamber 20 of the controlling device 16 on the same car, through pipe 22. The pressure of the fluid thus supplied to this chamber causes the pistons 18 and 19 of the controlling device on the same car to move in opposite directions against the pressure of the springs 48 and 49, respectively. As the piston 18 is moved, the end of the stem 30 engages the stem 35 of the valve 34 and unseats said valve against the pressure of the spring 50. Before the valve 34 is unseated the communication between the chambers 31 and 45, through the groove 44, is closed off. With the valve 34 unseated, fluid under pressure will flow from the main reservoir 21 into the chamber 31 and from thence, through pipe 37, to the chambers 36 and 42 of the brake pipe closing valve device 9 and piston device 38 respectively. The pressure of fluid in the main reservoir 21 is greater than the pressure of fluid in the brake pipe 6 as supplied from the main reservoir 21 through the usual feed valve device (not shown), so that, the pressure of fluid supplied to the chamber 36, causes the valve 10 to seat on the seat ring 47, closing off the flow of fluid under pressure in the brake pipe 6 to the face of the coupler 1. The pressure of fluid supplied to the piston chamber 42 causes the piston 39 to move outwardly to operate the lever 41 which in turn retracts the contact carrier of the electric train line coupler in the manner described in the hereinbefore mentioned issued patent. When the piston 39 has been moved a predetermined distance, it uncovers the port 43 in the casing, so that fluid under pressure flows from the piston chamber 42, through port and pipe 43, to the piston chamber 12 of the coupler lock operating mechanism associated with the coupler 1, and causes the piston 13 and stem 14 thereof to move forward, against the pressure of a spring 51, a sufficient distance to rotate the locking cam 3 of the coupler 1, out of locking engagement with the coupler 2.

As the piston 19 of the control device 16 is moved outwardly by the pressure of fluid in the chamber 20, the plunger 28, on the same car, will engage and move the plunger 28 and pistons 19 and 18 of the counterpart controlling device, on the adjacent car, rearwardly a sufficient distance that the stem 30 will engage the stem 35 of the valve 34 and unseat said valve, against the pressure of the spring 50, thus opening communication between the chambers 31 and 32, so that fluid under pressure supplied to the chamber 32, from a reservoir, not shown, but corresponding to the reservoir 21, flows past the unseated valve 34 into chamber 31 and from thence through pipe 37 to the brake pipe closing valve device and piston device of the electric portion, neither of which have been shown in the drawing, but which may be identical with those shown on the adjacent car, operating the brake pipe closing valve device to close off the flow of fluid under pressure through the brake pipe 6 to the face of coupler 2, and operating the piston device to retract the contact carrier of the electric train line coupler, the operation of these parts being hereinbefore fully described in connection with the adjacent car. When the piston device associated with the coupler 2 is operated, fluid under pressure is supplied therefrom to the piston chamber 12, causing the piston 13 and stem 14, of the coupler lock operating mechanism, associated with the coupler 2, to move forward against the pressure of the spring 51 to rotate the locking cam 4 out of locking engagement with the coupler 1. It will be understood that the locking cams 3 and 4 are operated substantially simultaneously.

Now, when the couplers are separated, the tappet valves 7 and 8 of both couplers will seat, closing off the flow of fluid to the meeting faces of the couplers.

As the couplers are being separated, the pressure of the co-operating counterpart plungers 28 will be relieved, so that the pressure of the spring 48 of the controlling device associated with the coupler 2 will cause the pistons 18 and 19, of this controlling device, to move outwardly to their normal positions of rest, and as they are so moved, the stem 30 of the piston 18 will move out of engagement with the stem 35 of the valve 34 and the pressure of the spring 50 will cause the valve 34 to seat, thus closing off further supply of fluid under pressure to the chambers 12, 42, 36 and 31 of the coupler lock operating mechanism, piston device 38, brake pipe closing valve device 9 and controlling device 16 respectively. When the piston 18 has been moved to its normal position of rest, the groove 44, in the stem 30, will connect the chambers 31 and 45, so that fluid under pressure in the chamber 12 of the coupler lock operating mechanism of the coupler 2 will be vented to the atmosphere by way of pipe 43, chamber 42 of the piston device 38, pipe 37, chamber 31 of the control device 16, groove 44 in the stem 30, chamber 45 and atmospheric port 46. The piston chamber 36 of the brake pipe closing valve device 9, associated with the coupler 2, is also vented to the atmosphere through pipe 37, and through the control device in the same manner as just described. As the chamber 12 is being vented, the pressure of the spring 51 causes the piston 13 and stem 14 to move downwardly a sufficient distance that the locking cam 4 will be permitted to move to a position when it will automatically lock with the coupler 1 when the couplers are again brought together. When the chamber 36 of the brake pipe closing valve device 9 is vented, the pressure of fluid in the brake pipe 6 will cause the valve 10 to unseat from the seat ring 47, so that fluid under pressure will flow to the coupler, but as the tappet valve 7 has been previously closed, fluid under pressure cannot escape to the atmosphere.

A trainman may now operate the handle 25, of the cock device 23, which is open, to its valve closing position as shown in full lines in Fig. 1 of the drawing, thus closing off the further supply of fluid under pressure to the chamber 31 of the controlling device associated with the coupler 1, and venting fluid under pressure from this chamber 20 to the atmosphere, by way of pipe 22, passage 26 of the plug valve 24 and atmospheric port 27 in the casing of the cock device 23. When the chamber 20 is thus vented, the pressure of the springs 48 and 49 will cause the pistons 18 and 19 to move toward each other to their normal positions of rest as shown in Fig. 1 of the drawing. This movement of the piston 18 will effect the operation of the lock operating mechanism for the locking cam 3, piston device 33, and brake pipe closing valve device 9, all associated with the coupler 1, in the same manner as has been described in connection with like parts associated with the coupler 2.

In some cases, it may be desired to associate my invention with couplers which do not have electric train line couplers, and in such cases the piston devices 38 are omitted and the pipes 37 are connected directly to the pipes 43, and when this is done, the operations of the several parts and devices which constitute the invention, will be the same as hereinbefore described.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. The combination with two coupled couplers for the adjacent ends of two vehicles, locks locking said couplers together in coupled position, piston devices operative by fluid under pressure for operating said locks to unlocking positions, a controlling device on one vehicle adapted to supply fluid under pressure to the piston device on the same vehicle, a controlling device on the other vehicle adapted to supply fluid under pressure to the piston device on said other vehicle, each of said controlling devices comprising a valve operative to supply fluid under pressure to one of said piston devices, a piston for operating said valve, a plunger for at one time operating said piston, said piston at another time being operated by fluid under pressure and said plunger being operated at the same time by fluid under pressure for operating the plunger, piston and valve of the counterpart controlling device.

2. The combination with two coupled couplers for the adjacent ends of two cars, of locks for locking said couplers in coupled position, piston devices operable by fluid under pressure for operating said locks to their unlocking positions, counterpart controlling devices for controlling the operation of said piston devices, each of said controlling devices comprising a normally seated valve operable to establish a communication through which fluid under pressure is supplied to one of said piston devices, a piston operable by fluid under pressure for engaging and unseating said valve to establish said communication, and also comprising a plunger adapted to engage the plunger of the counterpart controlling device, said plunger being movable by the fluid under pressure operating said piston for engaging and moving the plunger and piston means of said counterpart controlling device to unseat the valve of said counterpart controlling device to establish a communication through which fluid under pressure is supplied to the other of said piston devices, and a cock on each car operable manually for establishing communication through which fluid under pressure is supplied to operate the piston and plunger of one of said controlling devices.

3. The combination with two coupled couplers for the adjacent ends of two vehicles, of locks locking said couplers together, piston devices for operating said locks into and out of locking engagement with said couplers, and counterpart controlling devices on said vehicles operative to establish communication through which fluid under pressure is supplied to said piston devices to operate said piston devices to move said locks to their release positions, each of said controlling devices being carried by one vehicle and comprising a plunger, a piston and a valve, the piston of one of the controlling devices on one vehicle being operable at one time by fluid under pressure for operating the valve of the same controlling device to establish communication through which fluid under pressure is supplied to the piston device on the same vehicle to cause said piston device to operate to move the coupler lock on the same vehicle to its release position and the plunger of the same controlling device being operable at the same time, by fluid under pressure operating said piston, into engagement with the plunger of the controlling device on the other vehicle and for moving the plunger and piston of the controlling device on said other vehicle to move the valve of the last mentioned controlling device to establish communication through which fluid under pressure is supplied to the piston device on said other vehicle for causing said piston device to operate to move the coupler lock on said other vehicle to its release position.

4. The combination with two coupled couplers, of locks locking said couplers together, piston devices operable by fluid under pressure for moving said locks to their release positions, counterpart controlling devices for controlling the operation of said piston devices, said controlling devices comprising valves operative to establish communications through which fluid under pressure is supplied to said piston devices to cause the piston devices to operate to move said locks to their release positions and also comprising aligned plungers, and pistons, the piston of one of said controlling devices being subject at one time to fluid under pressure for operating the valve of the same device to establish communication through which fluid under pressure is supplied to one of the piston devices and the plunger of the same controlling device being subject to the pressure of fluid to which said piston is subjected for engaging and moving the plunger of the other of said controlling devices to cause the piston of said other controlling device to actuate the valve of said other controlling device to establish communication through which fluid under pressure is supplied to the other of said piston devices to cause the piston device to operate to move the other of said locks to its release position, and a cock device operative to establish communication through which the first mentioned piston and plunger is subjected to fluid under pressure.

5. The combination with two coupled couplers for the adjacent ends of two vehicles, of locks locking said couplers together in coupled position, piston devices operative by fluid under pressure for moving said locks to their unlocking positions, a controlling device on one vehicle adapted to establish communication through which fluid under pressure is supplied to the piston device on the same vehicle, a counterpart controlling device on the other vehicle adapted to establish communication through which fluid under pressure is supplied to the piston device on said other vehicle, each of said controlling devices comprising a valve normally closing off the flow of fluid under pressure to one of said piston devices and operative to establish communication through which fluid under pressure is supplied to the piston device, a piston subject at one time to the pressure of fluid for operating said valve, a cock device operative to establish communication through which fluid under pressure is supplied to one side of said piston, and a member movable by fluid under pressure supplied to one side of said piston into engagement with the corresponding member of the counterpart controlling device, the fluid pressure operated member moving the member and piston of the counterpart controlling device to actuate the valve of the counterpart controlling device to establish communication through which fluid under pressure is supplied to the other of said piston devices.

6. The combination with two coupled couplers for the adjacent ends of two vehicles, of locks locking said couplers in coupled position, piston devices operable by fluid under pressure for operating said locks to their unlocking positions, fluid conductors carried by said vehicles through which fluid under pressure is adapted to be supplied to said piston devices, a valve device on one vehicle operable to admit fluid under pressure to the fluid conductor on the same vehicle and consequently to the piston device on said vehicle, a counterpart valve device on the other of said vehicles operable to admit fluid under pressure to the fluid conductor on said other vehicle and consequently to the piston device on said other vehicle, each of said valve devices comprising a plunger, a piston and a valve, a fluid pressure supply source on each vehicle, a cock device on each vehicle operable manually for establishing a communication through which the plunger and piston of one of said valve devices are subjected to fluid under pressure from the fluid pressure supply source on the respective vehicle, fluid under pressure thus supplied to the valve device causing the piston thereof to move and actuate the valve of the valve device to admit fluid under pressure to the fluid conductor on the same vehicle and also causing the plunger thereof to engage and move the plunger and piston and thereby the valve of the counterpart valve device on the other vehicle to admit fluid under pressure to the fluid conductor carried by said other vehicle.

7. The combination with two coupled couplers for the adjacent ends of two vehicles, of locks locking said couplers together, piston devices operable by fluid under pressure for moving said locks to their release positions, fluid conductors through which fluid under pressure is adapted to be supplied to said piston devices, counterpart controlling devices on said cars adapted to cooperate to admit fluid under pressure to said fluid conductors and consequently to said piston devices, each of said controlling devices comprising a casing having a cylinder and also having a valve chamber normally charged with fluid under pressure, a normally seated valve in said valve chamber operable to admit fluid under pressure from said valve chamber to one of said fluid conductors, a piston and a plunger mounted in said cylinder portion of the casing, said casing, piston and plunger defining a pressure chamber, a fluid conductor through which fluid under pressure is adapted to be supplied to the pressure chamber, and a cock device operable to admit fluid under pressure to said conductor and consequently to said pressure chamber, said piston being responsive to fluid under pressure supplied to said pressure chamber to unseat said valve and said plunger being responsive to fluid under pressure supplied to said pressure chamber to engage and move the plunger of the counterpart controlling device to actuate the piston of said counterpart controlling device to unseat the valve of said counterpart device.

8. The combination with two coupled couplers for the adjacent ends of two vehicles, of locks locking said couplers together, piston devices operable by fluid under pressure for moving said locks to their release positions, fluid conductors through which fluid under pressure is adapted to be supplied to said piston devices, counterpart controlling devices on said cars adapted to cooperate to admit fluid under pressure to said fluid conductors and consequently to said piston devices, each of said controlling devices comprising a casing having a cylinder and also having a valve chamber normally charged with fluid under pressure, a normally seated valve in said valve chamber operable to admit fluid under pressure from said valve chamber to one of said fluid conductors, a piston and a plunger mounted in said cylinder portion of the casing, said casing, piston and plunger defining a pressure chamber, a fluid conductor through which fluid under pressure is adapted to be supplied to and released from said pressure chamber, and a cock device normally establishing a communication from the last mentioned fluid conductor and the atmosphere and operable to close said communication and to admit fluid under pressure to the fluid conductor and consequently to said pressure chamber, said piston being responsive to fluid under pressure in said pressure chamber to unseat said valve and said plunger being responsive to fluid under pressure in said pressure chamber to engage and move the plunger of the counterpart controlling device to actuate the piston of said counterpart controlling device to unseat the valve of said counterpart controlling device.

ROY R. STEVENS.